US009212616B2

United States Patent
Schwindt

(10) Patent No.: US 9,212,616 B2
(45) Date of Patent: Dec. 15, 2015

(54) FUEL SHUT-OFF COMMAND WITH ADAPTIVE CRUISE CONTROL

(71) Applicant: Robert Bosch GmbH, Stuttgart (DE)

(72) Inventor: Oliver Schwindt, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 13/912,815

(22) Filed: Jun. 7, 2013

(65) Prior Publication Data

US 2014/0019030 A1    Jan. 16, 2014

Related U.S. Application Data

(60) Provisional application No. 61/671,198, filed on Jul. 13, 2012.

(51) Int. Cl.
*F02D 41/10* (2006.01)
*G01S 13/93* (2006.01)
*F02D 41/12* (2006.01)

(52) U.S. Cl.
CPC .............. *F02D 41/10* (2013.01); *F02D 41/123* (2013.01); *F02D 41/126* (2013.01); *G01S 2013/9321* (2013.01)

(58) Field of Classification Search
CPC ....... Y02T 10/48; F02D 41/123; F02D 13/08; F02D 41/042; F02D 41/126; F02D 41/10; F02N 11/0818; G01S 2013/9321
USPC .............. 701/112, 93; 180/170; 123/198 DB, 123/325, 332, 179.3, 179.4, 179.7
See application file for complete search history.

(56) References Cited

U.S. PATENT DOCUMENTS

| | | | |
|---|---|---|---|
| 4,877,101 A | 10/1989 | Tada et al. | |
| 5,197,564 A * | 3/1993 | Nishimura et al. | 180/179 |
| 5,624,005 A * | 4/1997 | Torii | 180/179 |
| 5,646,851 A | 7/1997 | O'Connell et al. | |
| 6,941,216 B2 * | 9/2005 | Isogai et al. | 701/96 |
| 7,415,349 B2 | 8/2008 | Sato et al. | |
| 7,433,774 B2 | 10/2008 | Sen et al. | |

(Continued)

FOREIGN PATENT DOCUMENTS

EP          0781911         7/1997

OTHER PUBLICATIONS

International Search Report and Written Opinion for Application No. PCT/US2013/045559 dated Jan. 31, 2014 (8 pages).

*Primary Examiner* — Mahmoud Gimie
*Assistant Examiner* — David Hamaoui
(74) *Attorney, Agent, or Firm* — Michael Best & Friedrich LLP

(57) ABSTRACT

Methods and systems for disabling a fuel shut-off state of a vehicle. One method includes counting, by a controller, a number of transitions of an engine included in the vehicle between a fuel shut-off state and a fuel state, determining, by the controller, whether the number exceeds a predetermined threshold, and issuing a disable command, by the controller, to the engine included in the vehicle. The disable command causes the engine to exit a current fuel shut-off state. Another system includes a controller configured to determine whether acceleration is requested while an engine included in the vehicle is in a fuel shut-off state. When acceleration is requested while the vehicle is in a fuel shut-off state, the controller is configured to issue a disable command to the engine prior to issuing an acceleration command. The disable command causes the engine to exit the fuel shut-off state.

13 Claims, 3 Drawing Sheets

(56) References Cited

U.S. PATENT DOCUMENTS

| | | |
|---|---|---|
| 8,131,437 B2 | 3/2012 | Heap et al. |
| 8,214,112 B2 * | 7/2012 | Rew et al. .................. 701/51 |
| 8,386,150 B2 | 2/2013 | Whitney et al. |
| 8,401,768 B2 | 3/2013 | Lewis et al. |
| 8,790,218 B2 * | 7/2014 | Morimura et al. ............. 477/54 |
| 8,886,443 B2 * | 11/2014 | Gwon et al. .................. 701/112 |
| 2004/0163866 A1 | 8/2004 | Sen et al. |
| 2010/0010723 A1 | 1/2010 | Taki et al. |
| 2011/0166745 A1 * | 7/2011 | Tiwari et al. .................. 701/34 |
| 2012/0083987 A1 * | 4/2012 | Schwindt ...................... 701/96 |
| 2012/0204832 A1 | 8/2012 | Baur et al. |
| 2013/0110383 A1 * | 5/2013 | McDonald .................. 701/113 |

\* cited by examiner

FUEL SHUT-OFF COMMAND WITH ADAPTIVE CRUISE CONTROL

RELATED APPLICATIONS

The present application claims priority to U.S. Provisional Application No. 61/671,198, filed Jul. 13, 2012, the entire contents of which are hereby incorporated by reference.

BACKGROUND

To increase fuel economy, fuel delivery to an engine is shut-off when no torque is requested from the driver or from another device demanding torque (e.g., cruise control or adaptive cruise control ("ACC")) for a predetermined time. When the engine receives a fuel shut-off command (e.g., from an engine controller or a separate fuel controller or velocity controller), the engine enters a fuel shut-off state where no fuel is supplied to the engine. When engine torque is requested and the engine is in the fuel shut-off state, the engine exits the fuel shut-off state and enters a minimal injection state. In the minimal injection state, a minimal amount of fuel is injected to the engine for providing torque. From the minimal injection state, the engine increases the amount of injected fuel or switches to another injection state to obtain the necessary fuel for providing the requested torque.

The fuel shut-off state and the minimal injection state are each associated with a particular torque output of the engine. If torque is requested from the engine that is between these torque outputs, the engine cannot directly provide the requested torque. In addition, in these situations, the engine often oscillates between the two states while providing inadequate or overcompensated torque. Uncontrolled oscillation between the two engine states reduces fuel efficiency and mitigates or negates the benefits of fuel shut-off.

Switching the engine from the fuel shut-off state to the minimal injection state also takes time. For example, in some situations, it takes approximately 0.5 to 1.0 second to return the engine to a fuel state (e.g., the minimal injection state) after the engine has been placed in a fuel shut-off state. Also, during the time required to switch engine states, the engine cannot immediately respond to commands or requests. Therefore, the delay also creates a problem for systems and controllers communicating with the engine, such as an adaptive cruise control ("ACC") system. In particular, the time between a controller issuing a torque request to the engine and receiving a response is not constant, but varies based on whether the engine is in a fuel shut-off state.

Furthermore, when the engine is in the fuel shut-off state, there is no way for a system or controller to receive a quick engine response because of the delay required for switching engine states. In addition, if the system or controller attempts to make a request for a quick engine response, the engine usually responds with overcompensated torque too late. In addition, if the vehicle continuously oscillates between the two states as described above and the vehicle experiences torque overshooting each time the engine exits the fuel shut-off state, the driver experiences uncomfortable vehicle control.

To overcome the above problems, some ACC systems are configured to disable fuel shut-off when the ACC is functioning. Other ACC systems only allow fuel shut-off when the ACC system is braking the vehicle. Still other ACC systems use a combination of the above states based on the vehicle's current speed or acceleration. These approaches, however, do not solve all of the problems with fuel shut-off and often reduce or eliminate the fuel economy benefits associated with fuel shut-off.

SUMMARY

Therefore, embodiments of the present invention provide methods and systems for controlling fuel shut off, such as during adaptive cruise control ("ACC"). In particular, one system of the present invention includes an ACC system configured to generate a signal (e.g., a "fuel-shut-off-disable" signal) that commands the engine to exit a current fuel shut-off state or that keeps the engine from entering a fuel shut-off state. In some embodiments, the ACC system issues the fuel-shut-off-disable signal when the ACC system is performing or exiting a braking command and before issuing an engine torque request. In some embodiments, the ACC system is also configured to count the number of times the engine transitions from a fuel shut-off state to a fuel state (e.g., the minimal injection state) and vice version, where the transition is not associated with changes in vehicle speed or acceleration. When the count reaches or exceeds a predetermined threshold, the ACC system sends a fuel-shut-off-disable command to the engine to prevent further oscillations between the two engine states.

In particular, one embodiment of the invention provides a method of disabling a fuel shut-off state of a vehicle. The method includes counting, by a controller, a number of transitions of an engine included in the vehicle between a fuel shut-off state and a fuel state, determining, by the controller, whether the number exceeds a predetermined threshold, and when the count exceeds the predetermined threshold, issuing a disable command, by the controller, to the engine included in the vehicle. The disable command causes the engine to exit a current fuel shut-off state.

Another embodiment of the invention provides a system for disabling a fuel shut-off state of a vehicle. The system includes a controller configured to determine whether acceleration is requested while an engine included in the vehicle is in a fuel shut-off state, and when acceleration is requested while the vehicle is in a fuel shut-off state, issue a disable command to the engine prior to issuing an acceleration command. The disable command causes the engine to exit the fuel shut-off state.

Other aspects of the invention will become apparent by consideration of the following detailed description and figures.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium). As such, it should be noted that a plurality of hardware and software based devices, as well as a plurality of different structural components may be utilized to implement the invention.

An adaptive cruise control ("ACC") is similar to a traditional cruise control, but uses additional sensing equipment to detect other objects, e.g., a target vehicle in front of and in the same lane as the user's vehicle (i.e., the "host vehicle"). For example, when a user sets the host vehicle's speed to 60 miles per hour ("mph") and the host vehicle approaches a slower-moving vehicle in the same driving lane (i.e., a "target vehicle"), the ACC causes the host vehicle to slow down and avoid a collision. In particular, first, the ACC uses throttle and brake controls to reduce the speed of the host vehicle. Then, the ACC controls the speed of the host vehicle to maintain a particular following distance between the host vehicle and the target vehicle. If the host vehicle changes lanes, or the target vehicle changes lanes or otherwise is no longer detected by the ACC, and no new target vehicle within the particular distance is detected (i.e., a free driving scenario exists), the ACC causes the host vehicle to accelerate and then maintain the original user-set speed.

Figure 1:
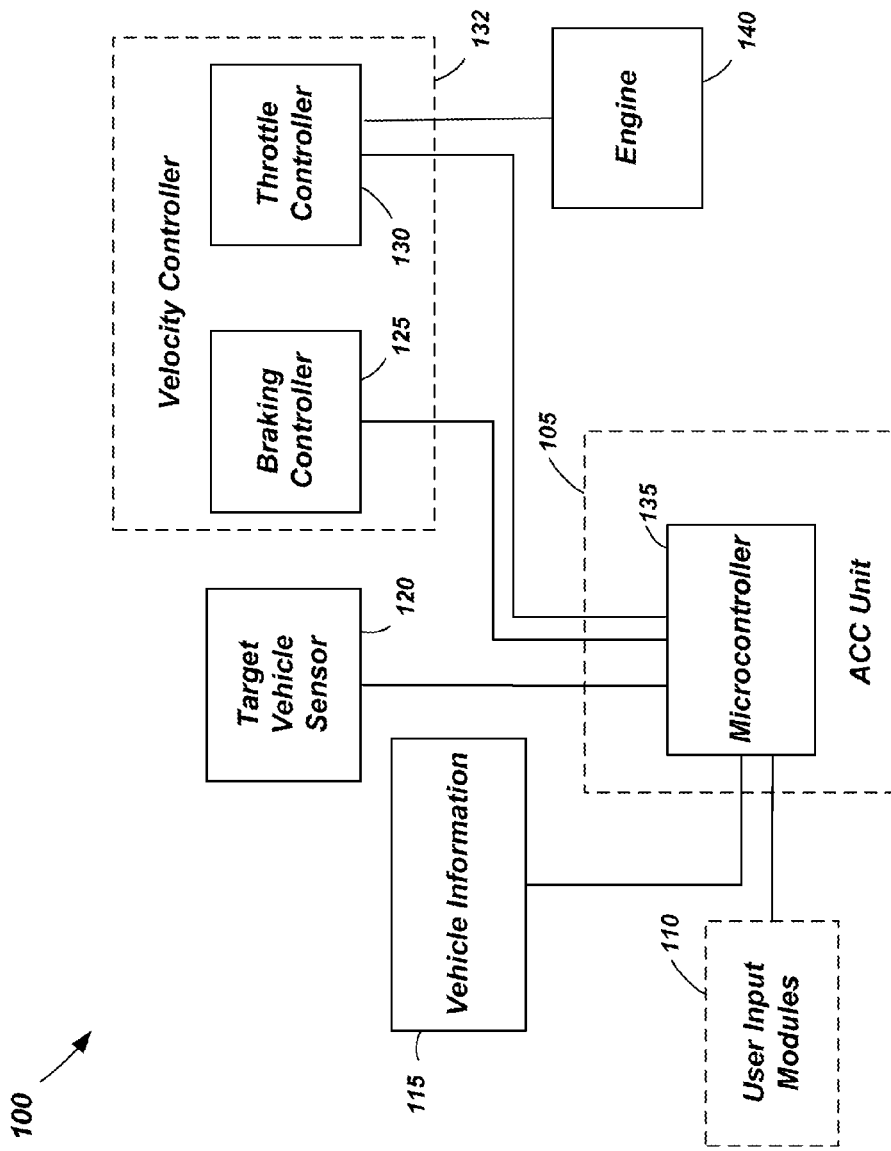
FIG. 1 schematically illustrates an adaptive cruise control system.

FIG. 1 illustrates an ACC system 100 installed in a vehicle. The ACC system 100 includes an ACC unit 105, user input modules 110, a vehicle information module 115, a target vehicle sensor 120, a braking controller 125, and an engine or throttle controller 130. The braking controller 125 and throttle controller 130 are part of a velocity controller 132 of the vehicle. The ACC unit 105 includes a microcontroller 135. It should be understood that the ACC system 100 and its components may include hardware (e.g., a microprocessor, discrete components, a field programmable gate array, or an application specific integrated circuit), software, or a combination thereof. The microcontroller 135 can include memory or other non-transitory computer-readable medium for storing software, data, or both.

The microcontroller 135 receives information from the target vehicle sensor 120 and receives vehicle status information from the vehicle information module 115. Vehicle status information includes, for instance, the current vehicle speed, acceleration rate (including a positive rate representing acceleration or a negative rate representing deceleration), yaw rate, and steering angle. The microcontroller 135 also receives information from the user input modules 110 that a user can use to set, modify, or cancel a desired cruise speed. In response to the received information, the microcontroller 135 issues commands to the velocity controller 132 to control the speed of the vehicle. In particular, the microcontroller 135 issues braking signals to the braking controller 125 and/or issues throttle input signals to the throttle controller 130. In response to the braking signals, the braking controller 125 controls the vehicle's braking system to output a braking force that slows the vehicle. In response to the throttle input signals, the throttle controller 130 either controls the vehicle's engine 140 to increase the vehicle's speed or decrease the vehicle's speed.

As noted above, for fuel economy, fuel supplied to the engine 140 is shut-off when no torque is requested from the driver or from another device demanding torque (e.g., the ACC control unit 105) for a predetermined time. For example, the velocity controller 132 (i.e., the throttle controller 130) or a separate controller issues a fuel shut-off command to the engine 140 when the driver (e.g., through the acceleration pedal) or the ACC control unit 105 has not requested torque (i.e., acceleration) for a predetermined time. In other embodiments, the engine 140 directly initiates a fuel shut-off state.

As noted above, shutting-off the fuel to the engine 140 causes acceleration delays, which are noticeable and uncomfortable to a driver. In particular, when the ACC control unit 105 is functioning, vehicle acceleration generally depends on whether an object is detected in front of the vehicle or whether a free driving scenario exists (i.e., no slower objects have been detected in front of the vehicle). When switching between these scenarios, vehicle acceleration often changes or jumps. For example, if the ACC control unit switches from a first target object to a second target object or switches from a target object situation to a free driving situation or vice-versa, the ACC control unit requests positive acceleration to account for the new driving scenario.

When the ACC control unit 105 determines that acceleration is needed or requested (i.e., engine torque is needed, such as to return the vehicle to the user-set cruise speed), the ACC control unit 105 cannot immediately request acceleration. In particular, for safety reasons, the ACC control unit 105 should not issue engine torque commands and brake commands simultaneously (except in start-up situations). Therefore, the ACC control unit 105 finishes braking (e.g., completely) before it issues an engine command. In addition, once the engine 140 receives the command from the ACC control unit 105, if the engine 140 is in a fuel shut-off state, the engine 140 needs to exit the fuel shut-off state and enter the minimal injection state before it can respond to the command from the ACC control unit 105. Therefore, there is a noticeable delay between the ACC control unit 105 issuing the engine command and the response from the engine 140.

Figure 2:
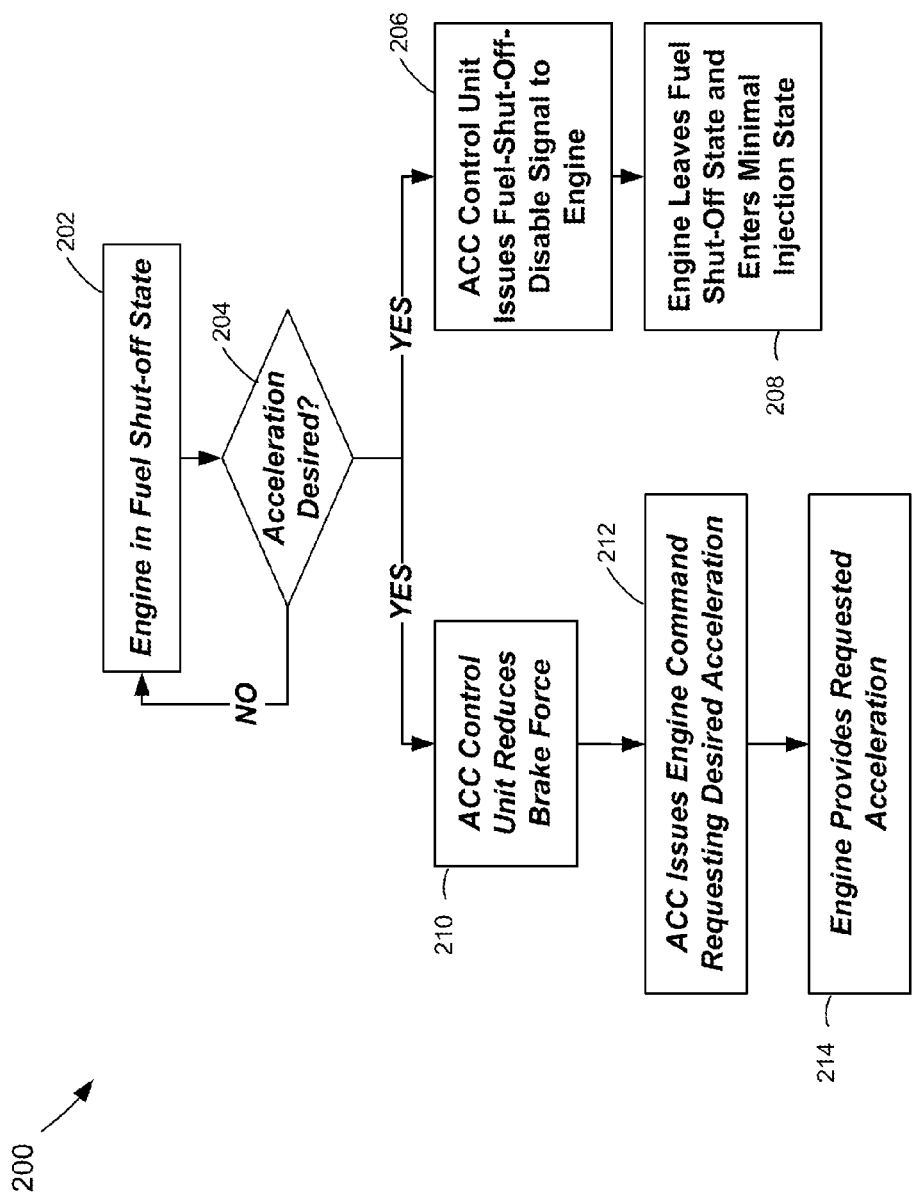
FIGS. 2-3 are flow charts illustrating methods of disabling fuel shut-off.

To decrease this delay, the ACC control unit 105 issues a special command to the engine 140 (e.g., through the throttle controller 130) to force the engine 140 out of the fuel shut-off state. FIG. 2 illustrates a method 200 performed by the ACC control unit 105 to control fuel shut-off to obtain a faster engine response. As illustrated in FIG. 2, when the engine 140 is in fuel shut-off state (at 202) and the ACC control unit 105 determines that acceleration is requested (at 204), the ACC control unit 105 issues a command to the engine 140 disabling fuel shut-off (e.g., a "fuel-shut-off-disable" command or signal) (at 206). In various embodiments, the ACC control unit 105 issues the fuel-shut-off-disable command when a desired acceleration is greater than an acceleration value associated with a minimal injection state. When the engine 140 receives the fuel-shut-off-disable signal from the ACC control unit 105, the engine 140 ignores or overrides the previous fuel shut-off command (e.g., issued by the velocity controller 132), exits the fuel shut-off state, and enters the minimal injection state (at 208). In various implementations, the engine 140 may enter the minimal injection state or another injection state based on the requested acceleration and/or engine torque.

As illustrated in FIG. 2, the ACC control unit 105 issues the fuel-shut-off-disable command while the ACC control unit 105 is still in the process of reducing and terminating brake force (at 210) and before the ACC control unit 105 issues an engine command requesting acceleration. Therefore, the engine 140 leaves the fuel shut-off state (or has at least started the process of transitioning from the fuel shut-off state to the minimal injection state) before the ACC control unit 105 issues the engine command. Accordingly, when the ACC control unit 105 issues the engine command (at 212), the engine 140 is in the minimal injection state and is prepared to react to the engine command with a shorter response time (i.e., within the usual response time when responding to an acceleration request while in the minimal injection state) (at 214).

As also noted above, in some embodiments, the engine 140 oscillates between a fuel shut-off state and a fuel state, such as a minimal injection state. In particular, when the ACC control unit 105 requests acceleration that requires a torque that is between the torque provided by the fuel shut-off state and the torque provided by the minimal injection state, the engine 140 may continuously switch between the fuel shut-off state and the minimal injection state. This situation often occurs when driving downgrades at particular speeds, depending on the gradient of the downgrades.

Figure 3:
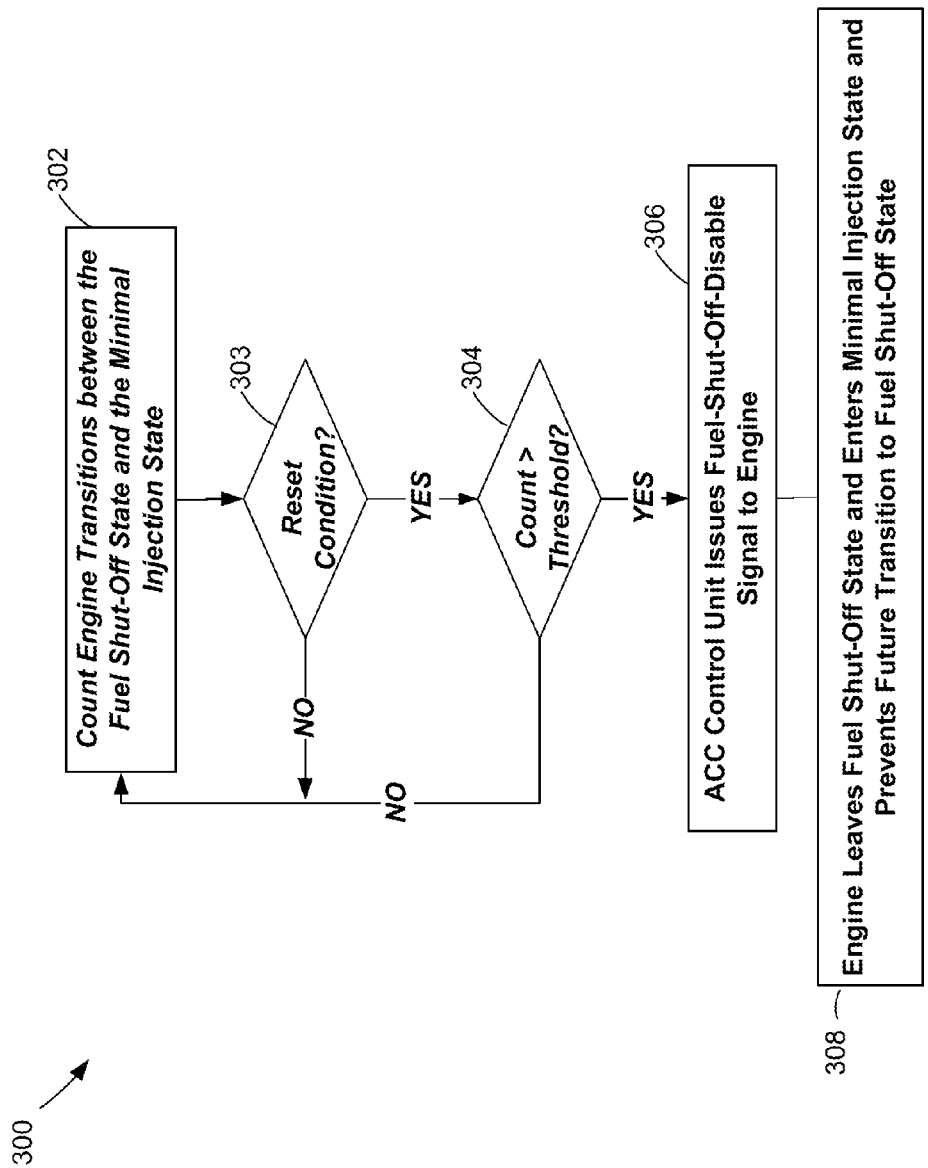

Continuously oscillating between the fuel shut-off state and a fuel state often results in overcompensated acceleration that is noticeable and uncomfortable to a driver. To overcome this problem, in some embodiments, the ACC control unit 105 is configured to control the fuel shut-off to avoid oscillating between engine states. In particular, FIG. 3 illustrates a method 300 performed by the ACC control unit 105 to control fuel shut-off to prevent unnecessary oscillation between engine states. As illustrated in FIG. 3, the ACC control unit 105 (or a separate controller) counts the number of times the engine transitions between the fuel shut-off state and a fuel state, such as the minimal injection state (at 302). When the number of transitions is greater than a predetermined threshold (at 304), the ACC control unit 105 sends a fuel-shut-off-disable command to the engine 140 to disable fuel shut-off (at 306). After the engine 104 receives the fuel-shut-off-disable command, the engine 140 leaves the fuel shut-off state and enters a fuel state, such as the minimal injection state, and prevents future transitions to the fuel shut-off state to prevent future oscillations (at 308). After receiving the fuel-shut-off-disable command, the engine 140 no longer enters the fuel shut-off state (e.g., for a predetermined period of time) and the vehicle's braking system is used to regulate engine torque and provide desired acceleration.

As illustrated in FIG. 3, in some embodiments, the ACC control unit 105 is also configured to reset the transition count (e.g., reset the number to zero) (at 303) when any one or a combination of the following conditions occur:

(i) acceleration (or deceleration) of the vehicle exceeds a predetermined threshold,
(ii) a change in speed exceeds a predetermined threshold after a previous (e.g., a first) fuel shut-off disable command is received by the engine 140,
(iii) the vehicle reaches a standstill, or
(iv) the adaptive cruise control is cancelled.

Uncomfortable oscillations typically occur during constant speed situations. Therefore, the ACC control unit 105 resets the transition number in the above situations that represent non-constant speed situations. In some embodiments, the ACC control unit 105 is also configured to detect the above conditions.

In addition, because a driver feels oscillations more at low vehicle speeds than at high vehicle speeds, in some embodiments, the ACC control unit 105 is configured to only count transitions (and issue fuel-shut-off-disable commands) when the vehicle is traveling below a predetermined speed threshold. Allowing "uncontrolled" oscillation at higher vehicle speeds is also more fuel efficient.

In some embodiments, the ACC control unit 105 (i.e., the microcontroller 135) runs an application (e.g., an "observer" application) to count and reset the number of transitions. In other embodiments, the observer application is configured as hardware or as a combination of hardware and software included in the ACC control unit 105 or a separate controller.

It should be understood that the fuel-shut-off-disable command is used during active ACC to prevent the engine 140 from entering a fuel shut-off state. There are also other vehicle conditions that prevent the engine 140 from entering a fuel shut-off state, such as during idle-control and catalyst heat control, which may take priority over the fuel-shut-off-disable command issued by the ACC control unit 105. In addition, although the above methods and systems are described in the context of ACC systems, it should be understood that the methods and systems can be used with standard cruise control system or during standard driver-operated control where acceleration is requested by the cruise control system or the driver (e.g., through an acceleration pedal).

Various features and advantages of the invention are set forth in the following claims.

What is claimed is:

1. A system for disabling a fuel shut-off state of a vehicle, the system comprising:
a controller configured to:
determine whether acceleration is requested while an engine included in the vehicle is in a fuel shut-off state,
when acceleration is requested while the vehicle is in the fuel shut-off state and reducing of braking force is applied to the vehicle, issue a disable command to the engine prior to issuing an acceleration command, wherein the disable command causes the engine to exit the fuel shut-off state and to enter a minimal injection state, and
issue the acceleration command.

2. The system of claim 1, wherein the controller is configured to determine whether acceleration is requested based on whether an increase in speed is needed to maintain the vehicle at a predetermined speed, and wherein the acceleration command is issued after the braking force is terminated.

3. The system of claim 1, wherein the controller is configured to determine whether acceleration is requested based on whether an increase in speed is needed to return the vehicle to a predetermined speed when an object is no longer detected in front of the vehicle, and wherein the acceleration command is issued after the braking force is terminated.

4. The system of claim 1, wherein the controller is configured to determine whether acceleration is requested based on whether a driver has requested an increase in acceleration using the acceleration pedal, and wherein the acceleration command is issued after the braking force is terminated.

5. The system of claim 1, wherein the controller increases the acceleration with a short response time when the acceleration requested is greater than an estimated acceleration available while the engine of the vehicle is in the injection state.

6. The system of claim 1, wherein the disable command prevents the engine from entering a future fuel shut-off state for a period of time, and wherein the acceleration command is issued after the braking force is terminated.

7. The system of claim 6, wherein the system comprises an adaptive cruise control system.

8. A system for disabling a fuel shut-off state of an engine included in a vehicle, the system comprising:
a controller configured to
determine whether acceleration is requested;
issue a disable command to the engine causing the engine to exit the fuel shut-off state and to enter a minimal injection state prior to issuing an acceleration command when the controller is in the process of reducing and terminating a brake force applied by a brake controller included in the vehicle; and issue the acceleration command when the engine has exited the fuel shut-off state and is in the minimal injection state, and no brake force is applied.

9. An adaptive cruise control system for disabling a fuel shut-off state of a vehicle, the system comprising:
a controller configured to:
determine whether acceleration is requested for issuing a desired acceleration command;
determine a reduction in a brake force applied by a brake controller of the vehicle;
prevent the issuing of the desired acceleration command while the brake force is being reduced when acceleration is requested;
issue a disable command to the engine causing the engine to exit the fuel shut-off state and enter a minimal injection state when acceleration is requested; and
issue the desired acceleration command to the engine to obtain the desired acceleration when the brake force is terminated.

10. The system of claim 9, wherein the controller is configured to determine whether acceleration is requested based on whether an increase in speed needed to maintain the vehicle at a predetermined speed.

11. The system of claim 9, wherein the controller is configured to determine whether acceleration is requested based on whether an increase in speed is needed to return the vehicle to a predetermined speed when an object is no longer detected in front of the vehicle.

12. The system of claim 9, wherein the controller is configured to issue the disable command before the controller terminates the brake force applied by the brake controller.

13. The system of claim 9, wherein the controller comprises an adaptive cruise controller.

* * * * *